United States Patent
DeVries et al.

(10) Patent No.: US 12,044,187 B2
(45) Date of Patent: Jul. 23, 2024

(54) WORK VEHICLE LOW CETANE POWER SYSTEM WITH EXTERNAL TO CYLINDER COMPRESSION IGNITION ASSISTANCE

(71) Applicant: Deere & Company, Moline, IL (US)

(72) Inventors: Kevin B. DeVries, Cedar Falls, IA (US); Craig W. Lohmann, Cedar Falls, IA (US); Danan Dou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/145,536

(22) Filed: Dec. 22, 2022

(65) Prior Publication Data
US 2024/0209806 A1 Jun. 27, 2024

(51) Int. Cl.
*F02D 19/06* (2006.01)
*B62D 49/06* (2006.01)
(Continued)

(52) U.S. Cl.
CPC ......... *F02D 19/0689* (2013.01); *B62D 49/06* (2013.01); *F02B 9/02* (2013.01);
(Continued)

(58) Field of Classification Search
CPC ............. F02D 19/0649; F02D 19/0602; F02D 19/0689; F02B 75/18; F02B 39/10; F02B 9/02
See application file for complete search history.

(56) References Cited

U.S. PATENT DOCUMENTS 6,321,699 B1 11/2001 Britton
8,522,756 B2 9/2013 Vuk et al.
(Continued)

FOREIGN PATENT DOCUMENTS

DE 102020119860 A1 2/2022
JP 2008223537 A 9/2008
(Continued)

OTHER PUBLICATIONS

Utility U.S. Appl. No. 17/659,368, filed Apr. 15, 2022.
(Continued)

*Primary Examiner* — Kevin A Lathers
(74) *Attorney, Agent, or Firm* — KLINTWORTH & ROZENBLAT IP LLP

(57) ABSTRACT

A power system for a work vehicle, includes an intake arrangement configured to intake charge air; a fuel arrangement configured to provide at least one fuel; a compression ignition engine including a plurality of piston-cylinder sets configured to receive, ignite, and combust the at least one fuel from the fuel arrangement and intake gas that includes the charge air from the intake arrangement to generate mechanical power and exhaust gas; at least one compression ignition assistance apparatus associated with at least one of the intake arrangement and the fuel arrangement; and a controller coupled to command the compression ignition assistance apparatus, the intake arrangement, and the fuel arrangement such that, in an enhancement mode, the controller commands activation of the compression ignition assistance apparatus; and in a nominal mode, the controller commands or maintains deactivation of the compression ignition assistance apparatus.

18 Claims, 4 Drawing Sheets

(51) Int. Cl.
*F02B 9/02* (2006.01)
*F02B 39/10* (2006.01)
*F02B 75/18* (2006.01)

(52) U.S. Cl.
CPC .............. *F02B 39/10* (2013.01); *F02B 75/18* (2013.01); *F02D 19/0602* (2013.01); *F02D 19/0649* (2013.01)

(56) References Cited

U.S. PATENT DOCUMENTS

| | | | |
|---|---|---|---|
| 9,316,180 | B2 | 4/2016 | Heiermann |
| 9,903,262 | B2 | 2/2018 | Edwards et al. |
| 11,536,213 | B2 | 12/2022 | Miles et al. |
| 11,572,673 | B2 | 2/2023 | Dou et al. |
| 11,572,824 | B2 | 2/2023 | Miles et al. |
| 11,795,869 | B1 | 10/2023 | Lohmann et al. |
| 2003/0200942 | A1 | 10/2003 | Dachtchenko et al. |
| 2006/0016420 | A1 | 1/2006 | Kuo et al. |
| 2007/0204747 | A1 | 9/2007 | Aoyama et al. |
| 2007/0295290 | A1 | 12/2007 | Cao |
| 2007/0295316 | A1* | 12/2007 | Davis ............... F02D 19/027 123/689 |
| 2013/0180485 | A1 | 7/2013 | Kamio |
| 2016/0010576 | A1 | 1/2016 | Primus et al. |
| 2018/0306098 | A1 | 10/2018 | Edwards et al. |
| 2019/0040826 | A1 | 2/2019 | McCarthy, Jr. et al. |
| 2020/0088081 | A1 | 3/2020 | Rohde et al. |
| 2021/0054777 | A1 | 2/2021 | Blumreiter et al. |
| 2022/0003184 | A1 | 1/2022 | Blumreiter et al. |
| 2022/0003318 | A1 | 1/2022 | Brushkivskyy et al. |
| 2022/0018297 | A1 | 1/2022 | Blumreiter et al. |
| 2022/0034284 | A1* | 2/2022 | Klingbeil ............ F02D 41/0025 |
| 2023/0160350 | A1 | 5/2023 | Klingbeil |

FOREIGN PATENT DOCUMENTS

| | | |
|---|---|---|
| WO | 2020232287 A1 | 11/2020 |
| WO | 2021174016 A1 | 9/2021 |
| WO | 2022011275 A1 | 1/2022 |

OTHER PUBLICATIONS

Non-Final Office Action issued in Utility U.S. Appl. No. 18/177,514 dated Jun. 27, 2023 (58 pages).
AVL—IWIS—Dual Mode VCS TM at httpswww.youtube.comwatchv=cAlb7wJ0Uk8, dated Sep. 11, 2017. (1 page).
CLEARFLAME—ClearFlame Engine Technologies Overview at httpswww.youtube, dated May 18, 2020. (1 page).
CLEARFLAME—SAE Chicago Presents: ClearFlame Engine Technologies at httpswww.youtube.comwatchv=fAIMtoIU2B8, dated Mar. 2021. (1 page).
FEV—VCR Conrod Coupled Simulation at httpswww.youtube.comwatchv=30sEeZ54X_s, dated May 23, 2017. (1 Page).
FEV—Explore FEV's VCR Conrod at httpswww.youtube.comwatchv=ABNZY3Enykg, dated Apr. 24, 2015. (1 page).
Wikipedia—Glow plug (diesel engine) at https://en.wikipedia.org/wiki/Glow_plug_(diesel_engine), undated, admitted prior art. (2 pages).
NISSAN—Nissan VC Turbo Engine (Variable Compression Turbo) at https://www.youtube.com/watch?v=YPDXgAWhrs4, dated Mar. 30, 2018. (4 pages).
Utility U.S. Appl. No. 17/975,399, filed Oct. 27, 2022.
Utility U.S. Appl. No. 17/977,016, filed Oct. 31, 2022.
USPTO Final Office Action issued in Utility U.S. Appl. No. 18/177,514 dated Dec. 1, 2023.
USPTO Non-Final Office Action issued in Utility U.S. Appl. No. 18/145,524 dated Mar. 13, 2024.
USPTO Non-Final Office Action issued in Utility U.S. Appl. No. 17/977,016 dated Feb. 16, 2024.
USPTO Non-Final Office Action issued in Utility U.S. Appl. No. 18/462,313 dated Feb. 28, 2024.

* cited by examiner

WORK VEHICLE LOW CETANE POWER SYSTEM WITH EXTERNAL TO CYLINDER COMPRESSION IGNITION ASSISTANCE

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for use in heavy work applications.

SUMMARY OF THE DISCLOSURE

The disclosure provides a work vehicle low cetane, compression ignition power system that facilitates ignition and support operation in a range of conditions.

In one aspect, the disclosure provides a power system for a work vehicle. The power system includes an intake arrangement configured to intake charge air; a fuel arrangement configured to provide at least one fuel; a compression ignition engine including a plurality of piston-cylinder sets configured to receive, ignite, and combust the at least one fuel from the fuel arrangement and intake gas that includes the charge air from the intake arrangement to generate mechanical power and exhaust gas; a compression ignition assistance apparatus associated with at least one of the intake arrangement and the fuel arrangement; and a controller coupled to command the compression ignition assistance apparatus, the intake arrangement, and the fuel arrangement such that, in an one or more auto-ignition assistance modes, the controller commands activation of the compression ignition assistance apparatus; and in a nominal mode, the controller commands or maintains deactivation of the compression ignition assistance apparatus.

In a further aspect of the power system, the fuel arrangement includes a first fuel source having a first fuel; the compression ignition assistance apparatus includes a second fuel source that also forms part of the fuel arrangement, the second fuel source having a second fuel with a cetane value greater than that of the first fuel; in an auto-ignition first assistance mode of the one or more auto-ignition assistance modes, the controller is configured to command activation of the compression ignition assistance apparatus such that the second fuel is injected into the plurality of the piston-cylinder sets; and in the nominal mode, the controller is configured to command or maintain deactivation of the compression ignition assistance apparatus such that only the first fuel is injected into the plurality of the piston-cylinder sets.

In a further aspect of the power system, in the auto-ignition first assistance mode of the one or more auto-ignition assistance modes, the controller is configured to command activation of the compression ignition assistance apparatus such that both of the first fuel and the second fuel are injected into the plurality of the piston-cylinder sets.

In a further aspect of the power system, the first fuel is a low cetane fuel and the second fuel is a high cetane fuel.

In a further aspect of the power system, the first fuel has a cetane value of less than 40. In a further aspect of the power system, the second fuel has a cetane value of at least 40.

In a further aspect of the power system, the compression ignition assistance apparatus includes an electric compressor that also forms part of the intake arrangement; in an auto-ignition second assistance mode of the one or more auto-ignition assistance modes, the controller is configured to command activation of the compression ignition assistance apparatus such that the electric compressor compresses at least a portion of the charge air; and in the nominal mode, the controller is configured to command or maintain deactivation of the electric compressor.

In a further aspect of the power system, the intake arrangement includes a charge air cooler configured to cool the charge air; in the auto-ignition second assistance mode of the one or more auto-ignition assistance modes, the controller is configured to command direction of the charge air through the compression ignition assistance apparatus such that the electric compressor compresses at least a portion of the charge air; and in the nominal mode, the controller is configured to command or maintain direction of the charge air through the charge air cooler to cool the charge air.

In a further aspect of the power system, in the enhancement mode, the controller is configured to command activation of the compression ignition assistance apparatus such that the compression of the charge air by the electric compressor results in a temperature of an air and fuel mixture of at least 800° C. at top dead center.

In a further aspect of the power system, the fuel arrangement includes a first fuel source having a first fuel and the compression ignition assistance apparatus includes a second fuel source that also forms part of the fuel arrangement, the second fuel source having a second fuel with a cetane value greater than that of the first fuel; the compression ignition assistance apparatus further includes an electric compressor that also forms part of the intake arrangement; in an auto-ignition first assistance mode of the one or more auto-ignition assistance modes, the controller is configured to command activation of the second fuel source of the compression ignition assistance apparatus such that the second fuel is injected into the plurality of the piston-cylinder sets; in an auto-ignition second assistance mode of the one or more auto-ignition assistance modes, the controller is configured to command activation of the electric compressor of the compression ignition assistance apparatus such that the electric compressor compresses at least a portion of the charge air; and in the nominal mode, the controller is configured to command or maintain deactivation of the compression ignition assistance apparatus such that only the first fuel is injected into the plurality of the piston-cylinder sets and the controller is configured to command or maintain deactivation of the electric compressor.

In a further aspect, the disclosure provides a work vehicle with a chassis; a drive assembly supported on the chassis; and a power system supported on the chassis and configured to power the drive assembly. The power system includes an intake arrangement configured to intake charge air; a fuel arrangement configured to provide at least one fuel; a compression ignition engine including a plurality of piston-cylinder sets configured to receive, ignite, and combust the at least one fuel from the fuel arrangement and intake gas that includes the charge air from the intake arrangement to generate mechanical power and exhaust gas; a compression ignition assistance apparatus associated with at least one of the intake arrangement and the fuel arrangement; and a controller coupled to command the compression ignition assistance apparatus, the intake arrangement, and the fuel arrangement such that, in an one or more auto-ignition assistance modes, the controller commands activation of the compression ignition assistance apparatus; and in a nominal mode, the controller commands or maintains deactivation of the compression ignition assistance apparatus.

In a further aspect of the work vehicle, the fuel arrangement includes a first fuel source having a first fuel; the compression ignition assistance apparatus includes a second fuel source that also forms part of the fuel arrangement, the second fuel source having a second fuel with a cetane value greater than that of the first fuel; in an auto-ignition first assistance mode of the one or more auto-ignition assistance modes, the controller is configured to command activation of the compression ignition assistance apparatus such that the second fuel is injected into the plurality of the piston-cylinder sets; and in the nominal mode, the controller is configured to command or maintain deactivation of the compression ignition assistance apparatus such that only the first fuel is injected into the plurality of the piston-cylinder sets.

In a further aspect of the work vehicle, in the auto-ignition first assistance mode of the one or more auto-ignition assistance modes, the controller is configured to command activation of the compression ignition assistance apparatus such that both of the first fuel and the second fuel are injected into the plurality of the piston-cylinder sets.

In a further aspect of the work vehicle, the first fuel is a low cetane fuel and the second fuel is a high cetane fuel.

In a further aspect of the work vehicle, the first fuel has a cetane value of less than 40.

In a further aspect of the work vehicle, the second fuel has a cetane value of at least 40.

In a further aspect of the work vehicle, the compression ignition assistance apparatus includes an electric compressor that also forms part of the intake arrangement; in an auto-ignition second assistance mode of the one or more auto-ignition assistance modes, the controller is configured to command activation of the compression ignition assistance apparatus such that the electric compressor compresses at least a portion of the charge air; and in the nominal mode, the controller is configured to command or maintain deactivation of the electric compressor.

In a further aspect of the work vehicle, 18. The work vehicle of claim 17, the intake arrangement includes a charge air cooler configured to cool the charge air; wherein, in the auto-ignition second assistance mode of the one or more auto-ignition assistance modes, the controller is configured to command direction of the charge air through the compression ignition assistance apparatus such that the electric compressor compresses at least a portion of the charge air; and in the nominal mode, the controller is configured to command or maintain direction of the charge air through the charge air cooler to cool the charge air.

In a further aspect of the work vehicle, in the enhancement mode, the controller is configured to command activation of the compression ignition assistance apparatus such that the compression of the charge air by the electric compressor results in a temperature of an air and fuel mixture of at least 800° ° C. at top dead center.

In a further aspect of the work vehicle, the fuel arrangement includes a first fuel source having a first fuel and the compression ignition assistance apparatus includes a second fuel source that also forms part of the fuel arrangement, the second fuel source having a second fuel with a cetane value greater than that of the first fuel; the compression ignition assistance apparatus further includes an electric compressor that also forms part of the intake arrangement; in an auto-ignition first assistance mode of the one or more auto-ignition assistance modes, the controller is configured to command activation of the compression ignition assistance apparatus such that the second fuel is injected into the plurality of the piston-cylinder sets; in an auto-ignition second assistance mode of the one or more auto-ignition assistance modes, the controller is configured to command activation of the second fuel source of the compression ignition assistance apparatus such that the electric compressor compresses at least a portion of the charge air; and in the nominal mode, the controller is configured to command or maintain deactivation of the electric compressor of the compression ignition assistance apparatus such that only the first fuel is injected into the plurality of the piston-cylinder sets and the controller is configured to command or maintain deactivation of the electric compressor.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
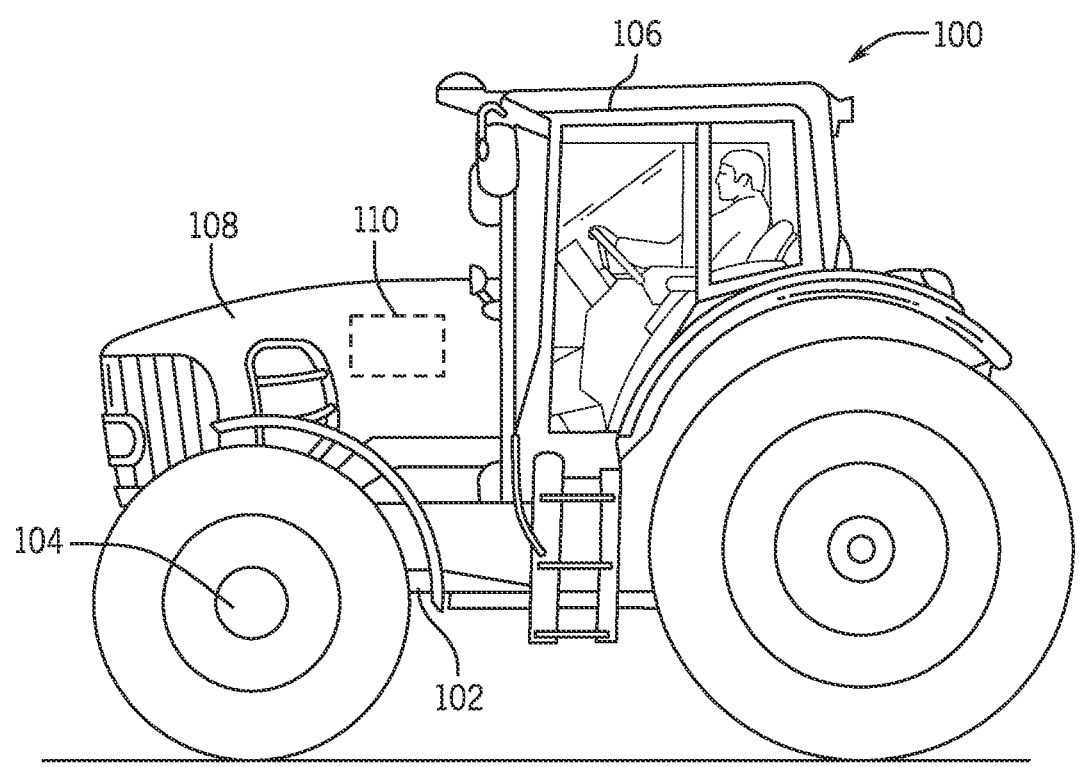
FIG. 1 is a simplified side view of an example work vehicle in the form of a tractor in which a power system may be used in accordance with an embodiment of this disclosure.

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for use in heavy work applications.

Generally, certain non-diesel fuels that have desirable sourcing, performance, and/or emission characteristics may have relatively low cetane numbers. A cetane number (or cetane value) is an indicator of the combustion speed of fuel and compression needed for ignition. The scale for measuring cetane numbers ranges from 0 to 100 with higher numbers indicating quicker ignition periods, thereby indicating lower temperatures and pressures required for combustion. In compression combustion engines (e.g., in diesel-type engines), ethanol is generally not used due to its relatively low cetane number (e.g., less than 5) that requires high temperatures for ignition. In other words, compression ignition engines that rely upon ethanol may encounter challenges in cold start and low load conditions in which the temperature is insufficient for reliable ignition. As examples, diesel fuel will reliably auto-ignite inside an engine cylinder at a temperature of about 500 to 600° C., while a fuel such as ethanol requires a temperature of about 850° C. in the cylinder to reliably auto-ignite.

According to examples discussed herein, a power system may include an engine that primarily operates on a low cetane fuel, such as ethanol and other alcohol-based fuels (e.g., methanol, propanol, etc.). Such power systems may include one or more elements or apparatus to enhance the reliability of ignition and combustion of the low cetane fuel within the compression ignition engine. Such apparatuses are referenced below as "compression ignition reliability enhancement apparatuses" or "compression ignition assistance apparatuses." Generally, in the discussion below, the compression ignition assistance apparatuses are considered "extra-cylinder" or "external to cylinder" in that such apparatuses manipulate the fuel and/or air prior to introduction in the piston-cylinder sets in a manner that enhances the ignition and combustion within the piston-cylinder sets. As discussed below, the compression ignition assistance apparatuses may include a fuel arrangement with a second, higher cetane fuel that may replace or supplement the low cetane fuel during certain conditions, e.g., during an auto-ignition first assistance mode. Additionally, the compression ignition assistance apparatuses may include an intake arrangement with an electric compressor that further compresses the charge air so as to increase the temperature of the intake gas during certain conditions, e.g., during the auto-ignition second assistance mode. Such arrangement and operation enable the use of a low cetane fuel with acceptable ignition and combustion performance in a diesel-type engine. The implementation of low cetane fuels may be facilitated by other aspects of the power system, as discussed in greater detail below.

Generally, as used herein, the term "low cetane fuel" may refer to a fuel with a cetane number (or value) less than that of diesel. For example, a low cetane fuel may have a cetane number of less than 40. One such example is ethanol with a cetane number of approximately 5. The term "high cetane fuel" may refer to a fuel with a cetane number (or value) that is equal to or higher than that of diesel. For example, a low cetane fuel may have a cetane number of greater than or equal to.

Referring to FIG. 1, in some embodiments, the disclosed power systems and methods with assistance apparatuses enable the use of low cetane fuels in a compression ignition engine. In the depicted example, such power systems and methods are implemented with a work vehicle 100 embodied as a tractor that uses low cetane fuels. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. As noted, the engine of the power system 108 may be a compression ignition engine for combustion that may result in improvements in emissions, performance, efficiency, and capability. Moreover, the engine may utilize a low cetane fuel, as introduced above and discussed in greater detail below. Otherwise, the power system 108 may include an air intake arrangement to direct air into the engine and a fuel arrangement to direct fuel (or fuels) into the engine for mixing with the air for combustion, as well as optional additional systems, such as turbocharger and/or exhaust recirculation (EGR) arrangements. Further, in addition to the engine, the power system 108 may use additional power sources, such as one or more batteries. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of low cetane fuels (e.g., ethanol). The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the control the assistance apparatuses associated with the engine, such as activation during one or more auto-ignition assistance modes and a deactivation during a nominal mode, as discussed below. Although not shown or described in detail herein, the work vehicle 100 may include any number of additional or alternative systems, subsystems, and elements. Additional information regarding the power system 108 are provided below, particularly the components associated with fuel and gas flows that function as external to cylinder assistance apparatuses that provide combustion chamber temperatures sufficient to auto-ignite and maintain combustion of low cetane fuels, particularly at low temperature or low load conditions.

Figure 2:
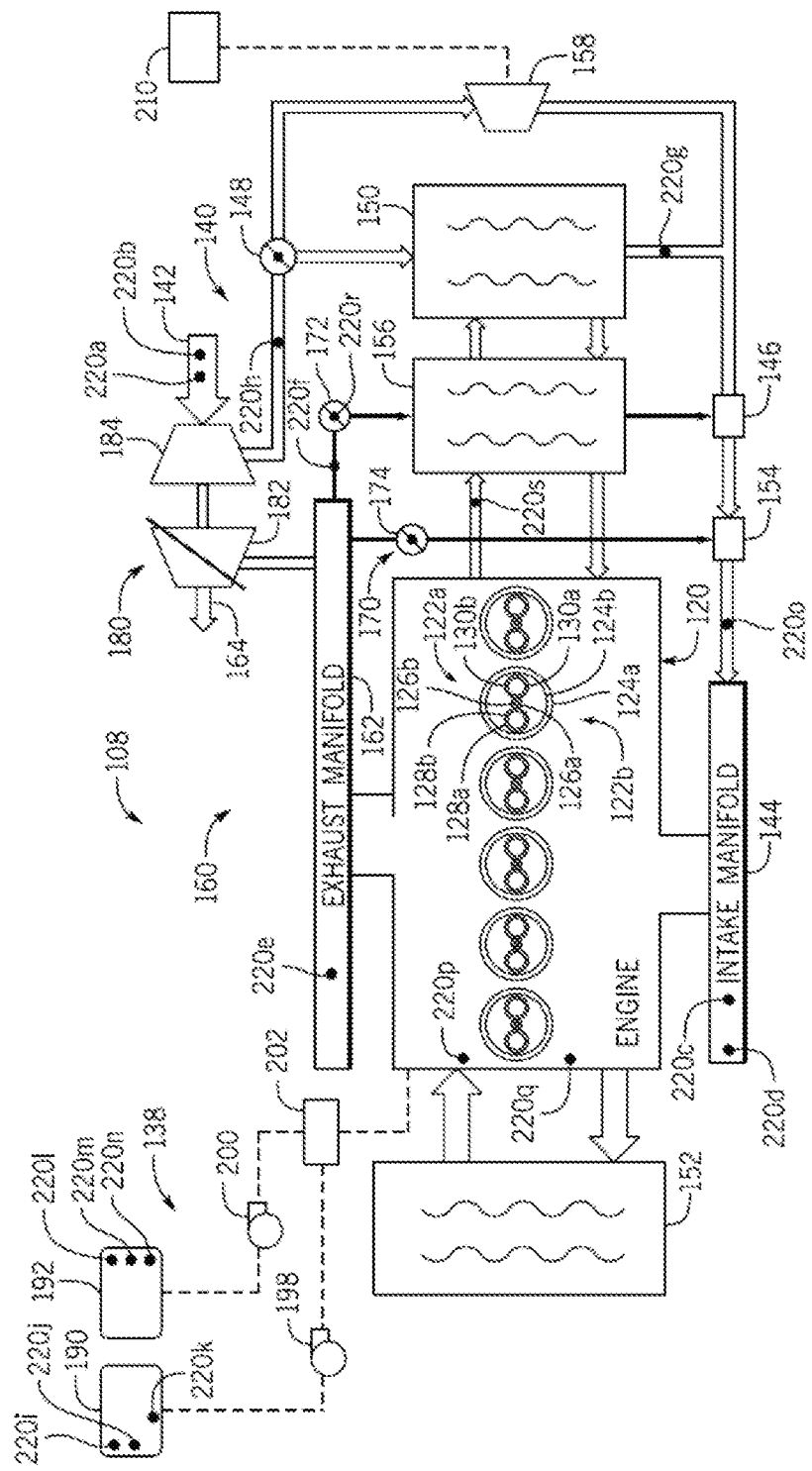
FIG. 2 is a simplified schematic diagram of a power system in accordance with an example embodiment.

Reference is initially made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 includes an engine 120 configured to combust a mixture of fuel from a fuel arrangement 138 and air from an air intake arrangement 140 to generate power for propulsion and various other systems, thereby generating an exhaust gas that is accommodated by an exhaust arrangement 160. As also introduced above, various aspects of the power system may be operated by the controller 110 (FIG. 1) based on operator commands and/or operating conditions. In various examples, the controller 110 may be a dedicated power system controller or a vehicle controller.

As noted, the engine 120 is primarily an engine that utilizes low cetane fuels, such as ethanol. Aside from the distinctions discussed herein, such an engine 120 may be similar to a diesel engine (i.e., compression ignition and combustion) in configuration and arrangement. The engine 120 may have any number or configuration of piston-cylinder sets 122a within an engine block 122b. In the illustrated implementation, the engine 120 is an inline-6 (1-6) engine defining six piston-cylinder sets 122a. Additional details about the piston-cylinder sets 122a are provided below. In addition to those discussed below, the engine 120 may include any suitable features, such as cooling systems, peripheries, drivetrain components, sensors, etc.

As noted above, the engine 120 is selectively provided fuel for combustion by the fuel arrangement 138, primarily a low cetane fuel, such as ethanol. Generally, the fuel arrangement 138 may include any suitable components to facilitate operation (e.g., pumping, flow control, storage, injection, and the like) of the engine 120 and overall power system 108. In one example, the fuel arrangement 138 may be considered a compression ignition assistance apparatus that selectively facilitates ignition and combustion reliability.

In this example, the fuel arrangement 138 may include a primary fuel tank that stores a primary fuel, such as ethanol, and a secondary fuel tank 192 that stores a secondary fuel, such as a relatively high cetane fuel. The fuel arrangement further includes a pump 198 to control the flow of the primary fuel from the primary fuel tank 190 and a pump 200 to control the secondary fuel from the secondary fuel tank 192. As discussed below, the controller 110 (FIG. 1) may provide commands to the pumps 198, 200 to monitor and/or meter the amounts of primary and secondary fuels to the engine 120. In one example, a fuel mixer 202 may also be provided to receive fuel from the primary and secondary fuel tanks 190, 192 and to mix the fuels prior to injection into the piston-cylinder sets 122a. In some embodiments, the fuel mixer 202 may be omitted such that the fuels are mixed within the piston-cylinder sets 122a.

As noted above, the primary fuel tank 190 generally stores a relatively low cetane fuel, such as ethanol; and the secondary fuel tank 192 generally stores a relatively high cetane fuel, such as diesel, ether, biodiesel, 2-methoxyethyl ether etc.

Preferred high cetane fuels should be polar molecules and liquids at ambient temperature in case of ethanol to facilitate miscibility As will be described in greater detail below, the primary fuel (e.g., the low cetane fuel) may generally be used in a nominal mode or conditions (e.g., during typical operation or high load operation). Further, the secondary fuel (e.g., the high cetane fuel) may generally be used in an "enhancement" or "auto-ignition assistance" modes (e.g., during start-up or low load operation). Additional details regarding the fuel arrangement 138 are provided below.

As also noted above, the engine 120 is selectively provided air for combustion by the air intake arrangement 140. The air intake arrangement 140, in this example, includes an intake conduit 142 and an air intake manifold 144. The air intake arrangement 140 directs fresh or ambient air through the air intake conduit 142; and the air intake manifold 144 directs at least a portion of that air into the air intake manifold 144 for introduction into the piston-cylinder sets 122a of the engine block 122b to be ignited with the fuel (e.g., ethanol) such that the resulting combustion products drive the mechanical output of the engine 120. Additional details about the air intake arrangement 140 will be provided below.

In one example and as schematically represented in FIG. 2, each of the piston-cylinder sets 122a includes a piston 124b arranged within the cylinder 124a to create a combustion chamber in between such that movement of the piston 124b within the cylinder 124a functions to facilitate the flow of gas into and out of the combustion chamber; to compress the gas within the combustion chamber to enable ignition and combustion; and to be driven by the combustion products to transfer the resulting mechanical power from the combustion process to a prime mover of the engine 120. Additionally, a fuel injector 126b is arranged to introduce an amount of fuel into the combustion chamber via a fuel port 126a. Moreover, an intake valve 130b is arranged to open and close an intake port 130a to admit intake gas from an intake conduit into the combustion chamber; and an exhaust valve 128b is arranged to open and close an exhaust port 128a to enable gas to flow out of the combustion chamber into an exhaust conduit.

Briefly, collectively and individually, the piston-cylinder sets 122a undergo a four-stroke power cycle in one example embodiment. Generally, the power cycle includes an intake stroke, a compression stroke, a power stroke, and an exhaust stroke, which are constantly repeated during operation of the engine 120. During the intake stroke, the piston 124b moves from the top dead center (TDC) to the bottom dead center (BDC); and during this movement, at least the intake valve 130b is open while the piston 124b pulls air into the combustion chamber by producing vacuum pressure into the cylinder 124a through the downward motion. During the compression stroke, the piston 124b moves from the bottom dead center (BDC) to the top dead center (TDC); and during this movement, both the intake and exhaust valves 130b, 128b are closed in this stroke, thereby resulting in adiabatic air compression to increase the pressure and temperature. At the end of this stroke, fuel is injected by the fuel injector 126b to be ignited and burned in the compressed hot gas. During the power stroke, the piston 124b is driven by the combustion of the fuel and gas mixture from the top dead center (TDC) to the bottom dead center (BDC); and during this movement, both the intake and exhaust valves 130b, 128b are closed. During the exhaust stroke, the piston 124b moves from the bottom dead center (BDC) to the top dead center (TDC); and during this movement, the exhaust valve 128b is open while the piston 124b forces exhaust gases out of the combustion chamber. At the end of this stroke, a crankshaft coupled to the piston 124b has completed a second full 360° revolution.

The exhaust gas produced from the combustion process of the engine 120 may be received by the exhaust arrangement 160, which includes an exhaust manifold 162 to receive and distribute the exhaust from the piston-cylinder sets 122a. At least a portion of the exhaust gas is directed from the exhaust manifold 162 into an exhaust conduit 164 out of the work vehicle 100, as described in greater detail below. Although not shown in detail, the exhaust gas may flow through one or more exhaust treatment components arranged proximate to the exhaust conduit 164. Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like.

In this example, the power system 108 may include an exhaust gas recirculation (EGR) arrangement 170 and a turbocharger 180, each of which may have at least portions that may also be considered part of (or otherwise cooperate with) the air intake arrangement 140 and/or the exhaust arrangement 160. In other examples, the EGR arrangement 170 and/or the turbocharger 180 may be omitted.

Generally, the EGR arrangement 170 is configured to direct at least a first portion of exhaust gas out of the engine 120 and then back to the air intake arrangement 140 of the engine 120 as EGR gas, i.e., such that a remaining, second portion of the exhaust gas is directed through the turbocharger 180 and out of the vehicle 100 (FIG. 1) via the exhaust conduit 164 as vehicle exhaust, as noted above. Generally, as discussed in greater detail below, the EGR gas may be mixed with charge air (e.g., recirculated back to intake) in order to reduce the formation of NOx during combustion that may otherwise occur. Any suitable amount of exhaust gas may be recirculated (e.g., 10%-20%).

The EGR arrangement 170 may include one or more EGR valves 172, 174 that operate to control the various flows of EGR gas and/or exhaust gas. In this example, the EGR arrangement 170 may have two "paths," e.g., a cooled path in which a first portion of EGR flow is directed through an EGR cooler 156 and a bypass path in which a second portion of EGR flow is directed around (and not through) the EGR cooler 156. Valves 172, 174 may be commanded (e.g., by controller 110 of FIG. 1) to control the amount of flow through and around the EGR cooler 156. The EGR cooler 156 may be any suitable device configured to lower the temperature of the recirculated gas. Generally, the EGR cooler 156 includes one or more recirculated gas passages and one or more coolant passages, arranged such that heat may be transferred from the recirculated gas to a cooperating fluid (e.g., air or liquid).

The turbocharger 180 generally functions to increase the amount of air subsequently directed into the engine 120 for improved engine efficiency and power output. In one example, the turbocharger 180 includes a turbine 182 that receives a portion (e.g., the second portion) of the exhaust gas, as introduced above. The turbocharger 180 further includes a compressor 184 that is driven by the turbine 182.

The compressor 184 functions to compress the ambient or charge air that enters the air intake arrangement 140 via the intake conduit 142. Generally, the turbocharger 180 may be a variable-geometry turbocharger, a wastegate (WG) turbocharger, a fixed turbocharger, and/or any other suitable type of turbocharger.

Returning to the air intake arrangement 140, the compressed charge air from the turbocharger compressor 184 may be selectively directed to either a charge air cooler 150 or an electric compressor 158 to appropriately condition the charge air for subsequent ignition and/or combustion within the engine 120. The flow of charge air to the charge air cooler 150 and/or the electric compressor 158 may be controlled by one or more valves 148 based on commands from the controller 110 (FIG. 1), as discussed in greater detail below.

Generally, the charge air cooler 150 operates to reduce the temperature of the compressed charge air from the turbocharger compressor 184. In this example, the charge air cooler 150 is configured to direct the charge air into proximity with cooling air (or other type of coolant) such that the heat is transferred from the charge air to the cooling air. Other cooling or heat exchange mechanisms may be provided. Briefly, the power system 108 may additionally include a second heat exchanger (or radiator) 152 to facilitate cooling of the engine 120 via circulation of the coolant over a cooling mechanism, such as air-cooled fins. The coolant of the radiator 152 may be on the same cooling circuit as the coolant of the charge air cooler 150 and EGR cooler 156, or the charge air cooler 150 and the radiator 152 may be on separate cooling circuits.

In one example, the electric compressor 158 may also be part of a compression ignition assistance apparatus that selectively facilitates ignition and combustion reliability. The electric compressor 158 may be utilized in lieu of or in combination with the dual fuel configuration of the fuel arrangement 138 discussed above. Generally, the electric compressor 158 functions to compress and/or heat the charge air from the turbocharger compressor 184. As a result of the elevated temperature, the charge air may more reliably auto-ignite and combust within the engine 120.

The electric compressor 158 may be powered by one or more power sources, particularly by one or more batteries 210. Other arrangements for powering the electric compressor 158 may be provided. As discussed in greater detail below, the increase in pressure and/or temperature of the charge air may provide enhancements for the ignition and/or compression of the low cetane fuel.

Downstream of the charge air cooler 150, EGR cooler 156, and the electric compressor 158, the cooled EGR gas (e.g., a first portion of the EGR gas) and the intake charge air are mixed within a first mixer 146 The relatively hot temperature of the first portion of EGR gas operates to increase the temperature of the charge air in the mixer 146. As shown, the amount of compressed charge air directed into through the charge air cooler 150 and to the first mixer 146 may be controlled by an air throttle valve 148; and the amount of cooled EGR gas directed to the first mixer 146 may be controlled by EGR valve 172. The mixture of charge air and EGR gas (or "first mixed gas") is directed into a second mixer 154.

In addition to the first mixed gas, the second mixer 154 selectively additionally receives a further portion (or second portion) of EGR gas. The amount of second portion of EGR gas directed to the second mixer 154 may be controlled by the second EGR valve 174, which in turn may be commanded by a controller (e.g., controller 110 of FIG. 1). Generally, the second portion of EGR gas has a greater temperature than the downstream first mixed gas. As such, the resulting second mixed gas (or intake gas) may have a greater temperature than the downstream first mixed gas and a lower temperature than the second portion of EGR gas. The second mixed gas (or intake gas) is directed to the intake manifold 144, which as noted above, distributes the intake gas to the piston-cylinder sets 122a of the engine 120 for mixture, ignition, and combustion with fuel from the fuel arrangement 138.

Generally, any type of sensor may be provided to facilitate operation of the drive assembly 108, including the example sensors 220a-220o schematically depicted in FIG. 2. One or more of the sensors 220a-220o may be omitted and/or additional sensors may be provided. The sensors 220a-220o may include an ambient temperature sensor 220a and an ambient pressure sensor 220b positioned in a suitable location (e.g., at the intake conduit 142) to measure or otherwise facilitate the determination of the respectively ambient pressure and ambient temperature. The sensors 220a-220o may further include an intake manifold temperature sensor 220c and an intake manifold pressure sensor 220d positioned within or proximate to the intake manifold 144 to respectively measure or otherwise facilitate the determination of the pressure and temperature of the intake gas prior to entry into the piston-cylinder sets 122a. In one example, the sensors 220a-220o may include an exhaust manifold pressure sensor 220e positioned within or proximate to the exhaust manifold 162 to measure or otherwise facilitate the determination of the pressure of the exhaust gas upon existing the piston-cylinder sets 122a. The sensors 220a-220o may further include an EGR temperature sensor 220f positioned along the circuit of the EGR flow to measure or otherwise facilitate the determination of the temperature of the recirculated gas. The sensors 220a-220o may further include a CAC out temperature sensor 220g positioned downstream of the cooler 150 to measure or otherwise facilitate the determination of the temperature of the gas downstream of the cooler 150. The sensors 220a-220o may further include an intake temperature sensor 220h positioned downstream of compressor 184 to measure or otherwise facilitate the determination of the temperature of the intake air. The sensors 220a may further include a primary fuel quantity sensor 220i, a primary fuel water sensor 220j, and primary fuel quality sensor 220k (which may be combined with the primary fuel water sensor 220j or vice versa) positioned within or proximate to the primary fuel tank 190 to respectively measure or otherwise facilitate the determination of the quantity of fuel in the primary fuel tank 190, the amount of water in the primary fuel tank 190, and the quality of the fuel in the primary fuel tank 190. The sensors 220a-220o may further include a secondary fuel quantity sensor 220l, a secondary fuel water sensor 220m, and secondary fuel quality sensor 220n (which may be combined with the primary fuel water sensor 220m or vice versa) positioned within or proximate to the secondary fuel tank 192 to respectively measure or otherwise facilitate the determination of the quantity of fuel in the secondary fuel tank 192, the amount of water in the secondary fuel tank 192, and the quality of the fuel in the secondary fuel tank 192. Further, the sensors 220a-220o may include a load input 220p (e.g., as a sensor or input representation of the load demand based on one or more inputs and/or operational conditions) and a speed sensor 220q positioned in suitable locations to respectively determine or otherwise derive the load demanded from the engine 120 and the speed of the engine 120. The sensors 220a-220o may additionally include an EGR sensor 220r that collects data associated with the EGR arrangement 170. For example, the EGR sensor 220r may be a valve position sensor for valve 172 and/or a flow sensor that collects information from which an EGR rate may be determined. The sensors 220a-220o may further include a coolant temperature sensor 220s positioned along the circuit of the engine coolant to measure or otherwise facilitate the determination of the temperature of the engine coolant. Generally, the sensors 220a-220o may provide inputs to the controller 110 in order to facilitate operation of the power system 108, particularly to facilitate implementation and operation of the auto-ignition assistance modes.

As introduced above, the controller 110 (FIG. 1) may control operation of the engine 120, including the fuel arrangement 138 and air intake arrangement 140, as well as various other cooperating systems and components. In particular, the controller 110 may selectively command a variation in the compression ratio of the piston-cylinder sets 122a to provide reliable ignition and combustion within the engine 120 under all appropriate conditions. Generally, the controller 110 (FIG. 1) may be in communication with the various valves 128b, 130b, 148, 172, 174, pumps 198, 200, injectors 126b, engine 120, sensors 220a-220s, and other associated components (e.g., the piston actuation arrangements discussed below) to collect information about operation of the power system 108 and to implemented or command modification and/or maintenance of such operation.

The power system 108 depicted in FIG. 2 is merely one example of a power system that may utilize a mechanism to enhance reliability with respect to ignition and/or combustion, as discussed in greater detail below with reference to FIGS. 3 and 4. Other configurations of power systems may be provided.

Figure 3:
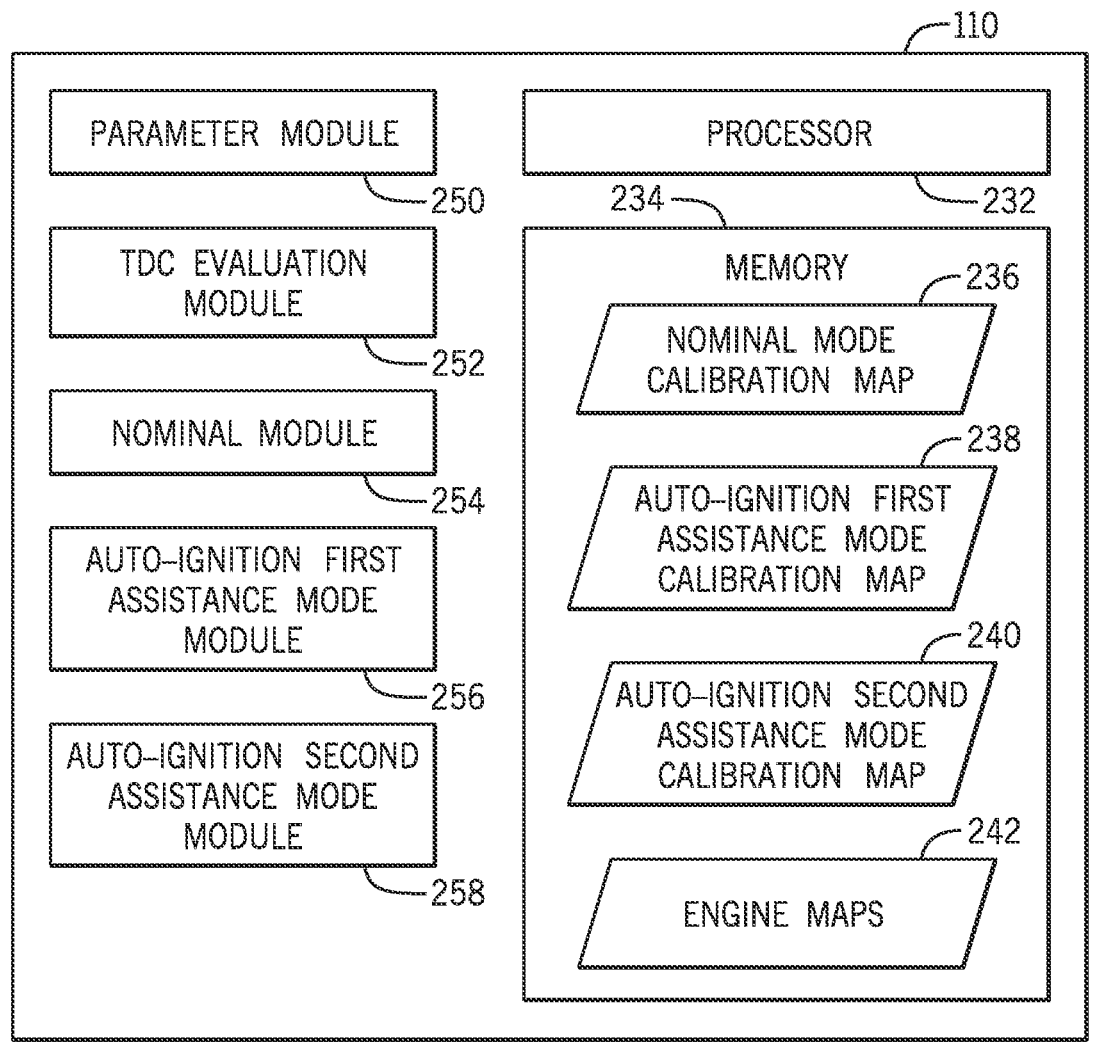
FIG. 3 is a block diagram of a compression ignition assistance control system that may be incorporated into the power system of FIG. 2 in accordance with an example embodiment.

One or more such configurations and/or mechanisms for compression ignition assistance is provided by FIG. 3, which is a block diagram of a reliability enhancement (or compression ignition assistance) control system that may be implemented by the controller 110 of the power system 108 of FIG. 2 in accordance with an example embodiment, although, such implementation may be provided in other contexts.

With respect to this function, the controller 110 may be organized as one or more functional units or modules 250, 252, 254, 256, 258 (e.g., software, hardware, or combinations thereof). As can be appreciated, the modules 250, 252, 254, 256, 258 shown in FIG. 3 may be combined and/or further partitioned to carry out similar functions to those described herein. As an example, each of the modules 250, 252, 254, 256, 258 may be implemented with processing architecture such as a processor and memory 234, as well as suitable communication interfaces. For example, the controller 110 may implement the modules 250, 252, 254, 256, 258 with the processor 232 based on programs or instructions stored in memory 234, including one or more maps or other data structures 236, 238, 240, 242.

As can be appreciated, the controller 110 shown in FIG. 3 may be configured to output one or more control signals to various aspects of the power system 108, including the pumps 198, 200 to control the flow of primary and secondary fuel to the engine 120 and the electric compressor 158 to compress intake air in order to facilitate compression assistance for ignition and combustion. In particular, the controller 110 may operate on one of at least three modes, including a nominal mode, an auto-ignition first assistance mode, and an auto-ignition second assistance mode, each of which will be discussed in greater detail below. In some examples, the consideration and implementation of the auto-ignition assistance modes and the nominal mode by the controller 110 are continuous, e.g., constantly active. In other examples, the activation of the auto-ignition assistance modes and the nominal mode may be selective, e.g., enabled or disabled based on input from the operator or other considerations. In any event, such modes may be enabled and implemented as described below.

Generally, the parameter module 250 functions to receive, condition, and/or evaluate input information from one or more sensors 220a-220o. The TDC temperature module 252 functions to estimate or otherwise determine a combustion chamber temperature when the piston is at a top dead center (TDC) position. The nominal mode module 254 functions to generate commands for the power system during a first set of conditions, typically according to normal or nominal conditions in which the temperatures are sufficient for auto-ignition of the primary fuel, e.g., based on a nominal mode calibration map 236. The auto-ignition first assistance mode module 256 functions to generate commands for the power system during a second set of conditions, typically when the conditions of the system 108 are such that the primary fuel may be supplemented with the secondary fuel, e.g., based on an auto-ignition first assistance mode calibration map 238. The auto-ignition second assistance mode module 258 functions to generate commands for the power system 108 during a third set of conditions, typically when the conditions of the system 108 are such that the intake air may be further compressed by the electric compressor 158, e.g., based on an auto-ignition second assistance mode calibration map 240. One particular implementation is described below with reference to FIG. 4.

Figure 4:
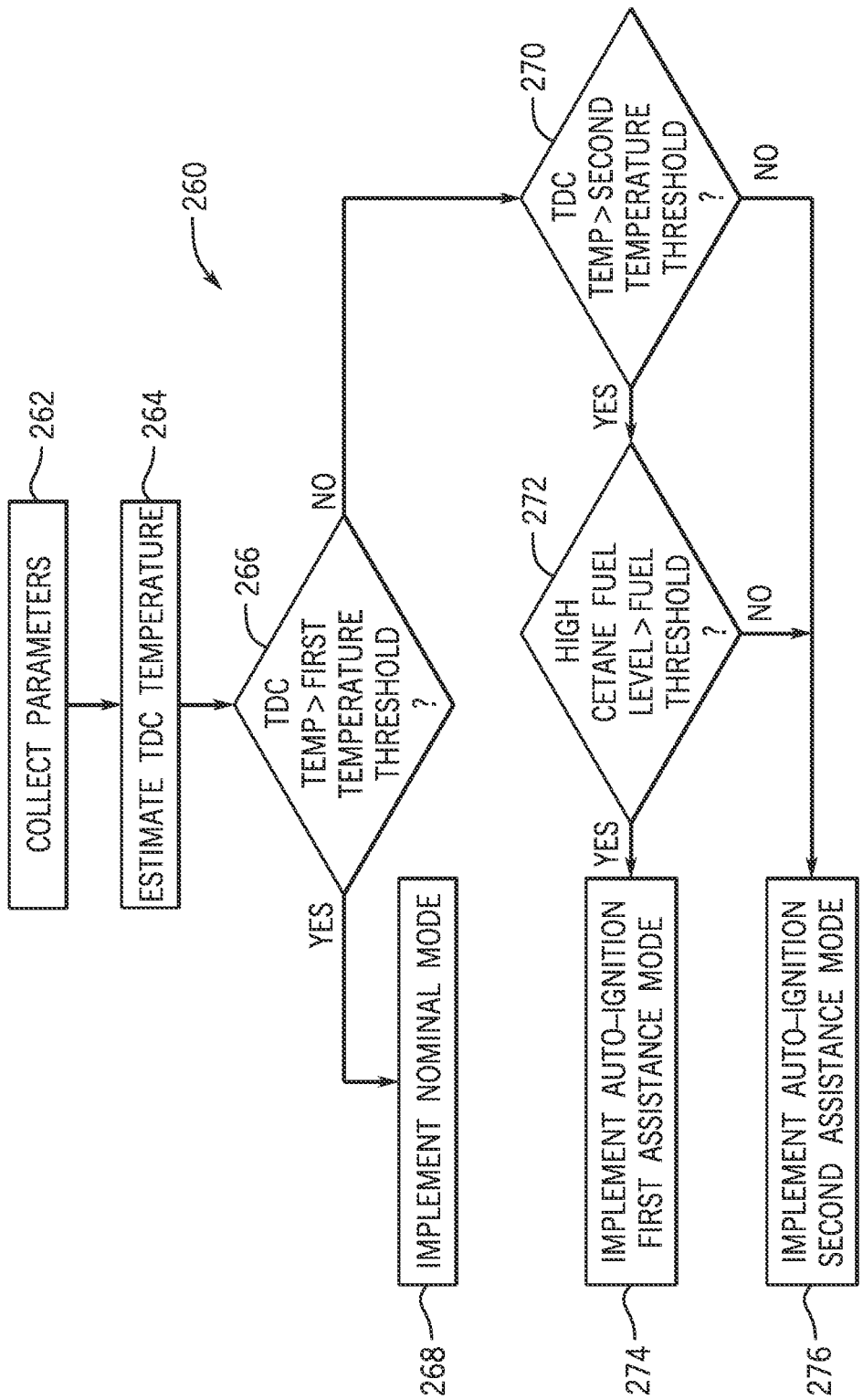
FIG. 4 is a flowchart of a low cetane compression ignition assistance mechanism that may be implemented by the power system of FIG. 2 in accordance with an example embodiment.

In one example, FIG. 4 is a flowchart of a method 260 of a low cetane compression ignition assistance mechanism that may be implemented by the controller 110 of FIG. 3 and the power system 108 of FIG. 2. The discussion of FIG. 4 below includes references to aspects of FIGS. 3 and 4.

In a first step 262, one or more parameters from the power system 108 are collected. For example, the parameter module 250 may receive various parameters, including an intake manifold temperature from the intake manifold temperature sensor 220c, an intake manifold pressure from the intake manifold pressure sensor 220d, an exhaust manifold pressure from the exhaust manifold pressure sensor 220e, a coolant temperature from the coolant temperature sensor 220s, an estimation of intake manifold gas properties (e.g., based on inputs from the EGR sensor 220r and derived from the engine map 242), a load demand from the load input 220p, the engine speed from the speed sensor 220q, and secondary fuel levels from fuel quantity sensor 220n. Other inputs may be considered, and/or one or more inputs may be omitted, by method 260.

In step 264, the TDC temperature module 246 functions to estimate or otherwise determine a combustion chamber temperature when the piston is at a top dead center (TDC) position.

The combustion chamber temperature at top dead center (TDC) (or, generally, the "TDC temperature") may be calculated or derived in any suitable manner. In one example, the TDC temperature may be a function of intake manifold temperature, the exhaust manifold pressure, the nature of the heat transfer to and from the combustion chamber, and the properties of the gas within the intake manifold. The intake manifold temperature and the exhaust manifold pressure may be respectively derived and/or determined from the information provided by the intake manifold temperature sensor 220c and the exhaust manifold pressure sensor 220e; and the nature of the heat transfer may be derived from the coolant temperature information provided by the coolant temperature sensor 220s.

The properties of the intake manifold gas may include the relative percentages of the $O_2$, $N_2$, $CO_2$, and $H_2O$, which may be derived from the EGR rate (e.g., based on information provided by the EGR sensor 220r) and the hydrocarbon ratio of the fuel (e.g., which may be a preset value according to fuel type and/or determined based on information from a sensor). In one example, the TDC temperature module 246 may determine the polytropic coefficient (k) of the intake gas based on the weighted averages of the constituent components (e.g., $O_2$ and $N_2$, each with a polytropic coefficient of approximately 1.4; $CO_2$ with a polytropic coefficient of approximately 1.29; and $H_2O$ with a polytropic coefficient of approximately 1.28).

In one example, the TDC temperature module 246 may calculate the TDC temperature according to the following formula (1):

$$T_{TDC} = T_{BDC} * \left[\left(\frac{V_{TDC}}{V_{BDC}}\right)^{1-k}\right] \quad (1)$$

wherein,
$T_{TDC}$ is the TDC temperature;
$T_{BDC}$ is the BDC temperature;
$V_{TDC}$ is the TDC volume;
$V_{BDC}$ is the BDC volume; and
k is the polytropic coefficient.

As noted above, the polytropic coefficient (k) may be determined based on the ratios of gas constituents derived from the percentage of EGR gas and the hydrocarbon ratio of the fuel. The volumes of the combustion chamber within the piston-cylinder set at top dead center ($V_{TDC}$) and at bottom dead center ($V_{BDC}$) may be derived based on known physical values or parameters of the piston cylinder sets and the present position of the piston actuation arrangement.

The BDC temperature ($T_{BDC}$) may be determined according to the following formula (2):

$$T_{BDC} = T_{IM} + \Delta T_{HT} + \Delta T_{RG} \qquad (2)$$

wherein, $T_{IM}$ is the gas temperature in the intake manifold;

$\Delta T_{HT}$ is the change in temperature due to heat transfer out of the combustion chamber; and $\Delta T_{RG}$ is the temperature change due to the percentage of residual gas remaining in the cylinder.

Generally, the change in temperature due to heat transfer ($\Delta T_{HT}$) is a function of the engine coolant temperature (e.g., from the coolant temperature sensor 220s), intake manifold temperature (e.g., from the intake manifold temperature sensor 220c), and intake manifold pressure (e.g., from the intake manifold pressure sensor 220d). In one example, the function to calculate the heat transfer ($\Delta T_{HT}$) may be in the form of either calibrated equations and/or a calibrated look-up table (e.g., as part of engine maps 242). Moreover, the temperature change due to residual gas ($\Delta T_{RG}$) may be a function of exhaust manifold pressure (e.g., from the exhaust manifold pressure sensor 220e) and intake manifold pressure (e.g., from the intake manifold pressure sensor 220d). As above, in one example, the function to calculate the temperature change due to residual gas ($\Delta T_{RG}$) may be in the form of either calibrated equations and/or a calibrated look-up table (e.g., as part of engine maps 242). Upon completion of the calculation, the method proceeds to step 266.

In step 266, the TDC temperature is compared to a first temperature threshold (or limit). Generally, the first temperature threshold corresponds to the auto-ignition temperature of the primary (or low cetane) fuel. For example, the auto-ignition temperature of ethanol is approximately 800-850° C. If the TDC temperature exceeds the first temperature threshold, the method 260 proceeds to step 268 in which the nominal mode is implemented (e.g., based on commands from the nominal mode module 254 and nominal mode calibration maps 236). If the TDC temperature does not exceed the first temperature threshold, the method 260 proceeds to step 270.

In step 270, the TDC temperature is compared to a second temperature threshold (or limit). Generally, the second temperature threshold corresponds to the auto-ignition temperature of the secondary (or high cetane) fuel. For example, the auto-ignition temperature of diesel is approximately 500-600° C. If the TDC temperature exceeds the second temperature threshold, the method 260 proceeds to step 272; and if the TDC temperature does not exceed the second temperature threshold, the method 260 proceeds to step 276.

In step 272, the level of the secondary fuel (e.g., the higher cetane fuel) is compared to a fuel threshold. If the secondary fuel level is greater than the fuel threshold, the method 260 proceeds to step 274 in which the auto-ignition first assistance mode is implemented. In one example of the auto-ignition first assistance mode, the pumps 198, 200 are manipulated such that the secondary fuel supplements or replaces the primary fuel in order to facilitate ignition and combustion, e.g., based on commands from the auto-ignition first assistance mode module 256 and auto-ignition first assistance mode calibration maps 238. In one example, a mixture of primary and secondary fuels is injected into the engine 120; while in another example, only the secondary fuel is injected into the engine 120. If the secondary fuel level is not greater than the second fuel threshold, the method proceeds to step 276.

In step 276, the auto-ignition second assistance mode is implemented. In one example of the auto-ignition second assistance mode, the electric compressor 158 is activated and operated in order to compress and increase the temperature of the intake air to facilitate ignition and combustion, e.g., based on commands from the auto-ignition second assistance mode module 258 and auto-ignition second assistance mode calibration maps 240. In this manner, one or more assistance modes may support the nominal mode in order to facilitate ignition and combustion.

Accordingly, the power systems discussed above provide the ability to use ethanol and other low cetane fuels in a diesel-type, compression ignition engine over a range of conditions, including cold starts and low load conditions. Overall, the power systems described herein result in a platform architecture that may provide improved fuel consumption, higher performance, and reduced criteria pollutants over a relatively wide temperature operating window. As noted, the piston actuation arrangement provides a variable compression ratio that enables the use of low cetane fuels over a range of conditions.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
an intake arrangement configured to intake charge air;
a fuel arrangement configured to provide at least one fuel;
a compression ignition engine including a plurality of piston-cylinder sets configured to receive, ignite, and combust the at least one fuel from the fuel arrangement and intake gas that includes the charge air from the intake arrangement to generate mechanical power and exhaust gas;
a compression ignition assistance apparatus associated with at least one of the intake arrangement and the fuel arrangement; and
a controller coupled to command the compression ignition assistance apparatus, the intake arrangement, and the fuel arrangement such that,
in one or more auto-ignition assistance modes, the controller commands activation of the compression ignition assistance apparatus; and
in a nominal mode, the controller commands or maintains deactivation of the compression ignition assistance apparatus;
wherein the compression ignition assistance apparatus includes an electric compressor that also forms part of the intake arrangement;
wherein, in an auto-ignition second assistance mode of the one or more auto-ignition assistance modes, the controller is configured to command activation of the compression ignition assistance apparatus such that the electric compressor compresses at least a portion of the charge air; and
wherein, in the nominal mode, the controller is configured to command or maintain deactivation of the electric compressor.

2. The power system of claim 1,
wherein the fuel arrangement includes a first fuel source having a first fuel;
wherein the compression ignition assistance apparatus includes a second fuel source that also forms part of the fuel arrangement, the second fuel source having a second fuel with a cetane value greater than that of the first fuel;
wherein, in an auto-ignition first assistance mode of the one or more auto-ignition assistance modes, the controller is configured to command activation of the compression ignition assistance apparatus such that the second fuel is injected into the plurality of the piston-cylinder sets; and
wherein, in the nominal mode, the controller is configured to command or maintain deactivation of the compression ignition assistance apparatus such that only the first fuel is injected into the plurality of the piston-cylinder sets.

3. The power system of claim 2,
wherein, in the auto-ignition first assistance mode of the one or more auto-ignition assistance modes, the controller is configured to command activation of the compression ignition assistance apparatus such that both of the first fuel and the second fuel are injected into the plurality of the piston-cylinder sets.

4. The power system of claim 2, wherein the first fuel is a low cetane fuel and the second fuel is a high cetane fuel.

5. The power system of claim 2, wherein the first fuel has a cetane value of less than 40.

6. The power system of claim 5, wherein the second fuel has a cetane value of at least 40.

7. The power system of claim 1,
wherein the intake arrangement includes a charge air cooler configured to cool the charge air;
wherein, in the auto-ignition second assistance mode of the one or more auto-ignition assistance modes, the controller is configured to command direction of the charge air through the compression ignition assistance apparatus such that the electric compressor compresses at least a portion of the charge air; and
wherein, in the nominal mode, the controller is configured to command or maintain direction of the charge air through the charge air cooler to cool the charge air.

8. The power system of claim 7,
wherein, in the enhancement mode, the controller is configured to command activation of the compression ignition assistance apparatus such that the compression of the charge air by the electric compressor results in a temperature of an air and fuel mixture of at least 800° C. at top dead center.

9. The power system of claim 1,
wherein the fuel arrangement includes a first fuel source having a first fuel and the compression ignition assistance apparatus includes a second fuel source that also forms part of the fuel arrangement, the second fuel source having a second fuel with a cetane value greater than that of the first fuel;

wherein, in an auto-ignition first assistance mode of the one or more auto-ignition assistance modes, the controller is configured to command activation of the second fuel source of the compression ignition assistance apparatus such that the second fuel is injected into the plurality of the piston-cylinder sets; and wherein, in the nominal mode, the controller is configured to command or maintain deactivation of the compression ignition assistance apparatus such that only the first fuel is injected into the plurality of the piston-cylinder sets.

10. A work vehicle, comprising:
a chassis;
a drive assembly supported on the chassis;
a power system supported on the chassis and configured to power the drive assembly, the power system comprising:
an intake arrangement configured to intake charge air;
a fuel arrangement configured to provide at least one fuel;
a compression ignition engine including a plurality of piston-cylinder sets configured to receive, ignite, and combust the at least one fuel from the fuel arrangement and intake gas that includes the charge air from the intake arrangement to generate mechanical power and exhaust gas;
a compression ignition assistance apparatus associated with at least one of the intake arrangement and the fuel arrangement; and
a controller coupled to command the compression ignition assistance apparatus, the intake arrangement, and the fuel arrangement such that,
in one or more auto-ignition assistance modes, the controller commands activation of the compression ignition assistance apparatus; and
in a nominal mode, the controller commands or maintains deactivation of the compression ignition assistance apparatus;
wherein the compression ignition assistance apparatus includes an electric compressor that also forms part of the intake arrangement;
wherein, in an auto-ignition second assistance mode of the one or more auto-ignition assistance modes, the controller is configured to command activation of the compression ignition assistance apparatus such that the electric compressor compresses at least a portion of the charge air; and
wherein, in the nominal mode, the controller is configured to command or maintain deactivation of the electric compressor.

11. The work vehicle of claim 10,
wherein the fuel arrangement includes a first fuel source having a first fuel;
wherein the compression ignition assistance apparatus includes a second fuel source that also forms part of the fuel arrangement, the second fuel source having a second fuel with a cetane value greater than that of the first fuel;
wherein, in an auto-ignition first assistance mode of the one or more auto-ignition assistance modes, the controller is configured to command activation of the compression ignition assistance apparatus such that the second fuel is injected into the plurality of the piston-cylinder sets; and wherein, in the nominal mode, the controller is configured to command or maintain deactivation of the compression ignition assistance apparatus such that only the first fuel is injected into the plurality of the piston-cylinder sets.

12. The work vehicle of claim 11,
wherein, in the auto-ignition first assistance mode of the one or more auto-ignition assistance modes, the controller is configured to command activation of the compression ignition assistance apparatus such that both of the first fuel and the second fuel are injected into the plurality of the piston-cylinder sets.

13. The work vehicle of claim 11, wherein the first fuel is a low cetane fuel and the second fuel is a high cetane fuel.

14. The work vehicle of claim 11, wherein the first fuel has a cetane value of less than 40.

15. The work vehicle of claim 14, wherein the second fuel has a cetane value of at least 40.

16. The work vehicle of claim 10,
wherein the intake arrangement includes a charge air cooler configured to cool the charge air;
wherein, in the auto-ignition second assistance mode of the one or more auto-ignition assistance modes, the controller is configured to command direction of the charge air through the compression ignition assistance apparatus such that the electric compressor compresses at least a portion of the charge air; and
wherein, in the nominal mode, the controller is configured to command or maintain direction of the charge air through the charge air cooler to cool the charge air.

17. The work vehicle of claim 16,
wherein, in the enhancement mode, the controller is configured to command activation of the compression ignition assistance apparatus such that the compression of the charge air by the electric compressor results in a temperature of an air and fuel mixture of at least 800° C. at top dead center.

18. The work vehicle of claim 10,
wherein the fuel arrangement includes a first fuel source having a first fuel and the compression ignition assistance apparatus includes a second fuel source that also forms part of the fuel arrangement, the second fuel source having a second fuel with a cetane value greater than that of the first fuel;
wherein, in an auto-ignition first assistance mode of the one or more auto-ignition assistance modes, the controller is configured to command activation of the compression ignition assistance apparatus such that the second fuel is injected into the plurality of the piston-cylinder sets;
wherein, in an auto-ignition second assistance mode of the one or more auto-ignition assistance modes, the controller is configured to command activation of the second fuel source of the compression ignition assistance apparatus when the electric compressor compresses at least a portion of the charge air; and
wherein, in the nominal mode, the controller is configured to command or maintain deactivation of the electric compressor of the compression ignition assistance apparatus such that only the first fuel is injected into the plurality of the piston-cylinder sets.

* * * * *